US008514941B2

(12) United States Patent
Shi et al.

(10) Patent No.: US 8,514,941 B2
(45) Date of Patent: **\*Aug. 20, 2013**

(54) METHOD AND APPARATUS FOR MOTION VECTOR PROCESSING

(75) Inventors: Fang Shi, San Diego, CA (US); Vijayalakshmi R. Raveendran, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 103 days.

This patent is subject to a terminal disclaimer.

(21) Appl. No.: 12/963,563

(22) Filed: Dec. 8, 2010

(65) Prior Publication Data

US 2011/0080955 A1    Apr. 7, 2011

Related U.S. Application Data

(63) Continuation of application No. 11/186,154, filed on Jul. 20, 2005, now Pat. No. 7,852,938.

(60) Provisional application No. 60/589,900, filed on Jul. 20, 2004.

(51) Int. Cl.
*H04N 7/12* (2006.01)
*G06K 9/36* (2006.01)

(52) U.S. Cl.
USPC ...................................... 375/240.16; 382/236

(58) Field of Classification Search
USPC .................... 375/240.01–240.29; 382/236
See application file for complete search history.

(56) References Cited

U.S. PATENT DOCUMENTS

| 5,447,272 | A | | 9/1995 | Ask | |
|---|---|---|---|---|---|
| 5,477,272 | A | * | 12/1995 | Zhang et al. | 375/240.06 |
| 5,844,613 | A | * | 12/1998 | Chaddha | 375/240.12 |
| 6,625,333 | B1 | | 9/2003 | Wang et al. | |
| 6,845,130 | B1 | * | 1/2005 | Han et al. | 375/240.16 |
| 7,852,938 | B2 | | 12/2010 | Shi et al. | |
| 2004/0057519 | A1 | | 3/2004 | Yamamoto et al. | |
| 2005/0232499 | A1 | * | 10/2005 | Ha et al. | 382/236 |

FOREIGN PATENT DOCUMENTS

| FR | 2773038 A1 | 6/1999 |
|---|---|---|
| KR | 20040024471 A | 3/2004 |

OTHER PUBLICATIONS

Dufaux et al., "Multigrid Block Matching Motion Estimation with an Adaptive Local Mesh Refinement," Proceedings of the SPIE, Bellingham, Virginia, XP000915608, 1818:97-109 (1993).
International Preliminary Report on Patentability, PCT/US05/025801, The International Bureau of WIPO, Geneva, Switzerland, Mar. 28, 2008.

(Continued)

*Primary Examiner* — Gims Philippe
(74) *Attorney, Agent, or Firm* — Arent Fox LLP

(57) ABSTRACT

A method for processing a plurality of motion vectors is disclosed. The method includes determining a number of different block sizes in the video frame; and, performing a variable block size motion vector process if the number of different block sizes in the video frame is greater than one, the variable block size motion vector process comprising constructing a pyramid of motion vectors from the plurality of motion vectors, the pyramid having at least a first layer and a second layer of motion vectors, each of the first and second layers having a set of motion vectors based on a particular block size. An apparatus for performing the inventive method is also disclosed.

16 Claims, 7 Drawing Sheets

(56) References Cited

OTHER PUBLICATIONS

International Search Report, PCT/US05/025801, International Search Authority, European Patent Office, Nov. 30, 2005.

Wang, "Comparison of Motion-Compensated Algorithms for Frame Interpolation," Optical Engineering, Society of Photo-Optical Instrumentation Engineers, XP001174142, 42(2):586-590—2003.

Wang et al., "A Confidence Measure Based Moving Object Extraction System Built for Compressed Domain," Circuits and Systems, 2000 IEEE International Symposium, )CP010504123,May 28-31, 2000.

Wong et al., "Modified Motion Compensated Temporal Frame Interpolation for Very Low Bit Rate Video," 1996 IEEE International Conference on Acoustics, Speech, and Signal Processing,XP000681693, May 7, 1996.

Written Opinion, PCT/US05/025801, International Search Authority, European Patent Office,Nov. 30, 2005.

\* cited by examiner

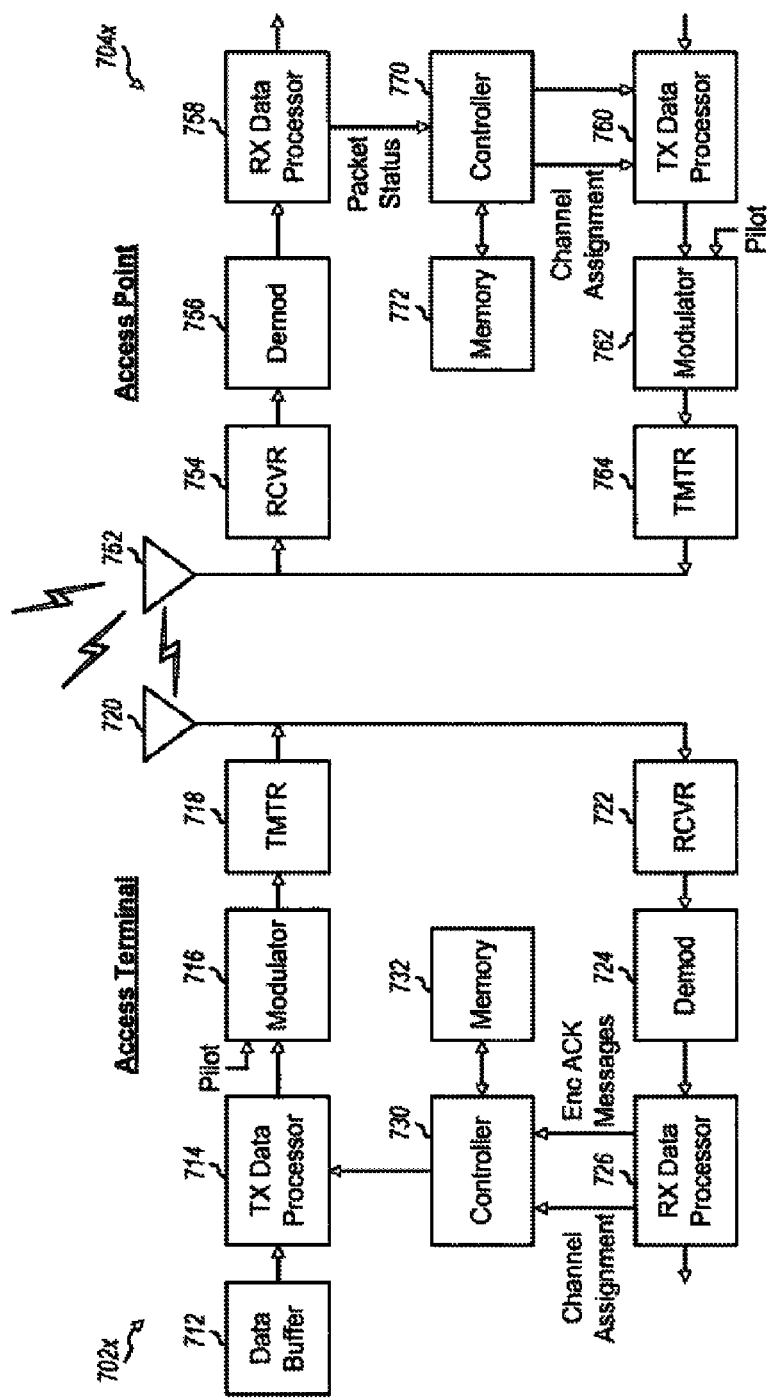

METHOD AND APPARATUS FOR MOTION VECTOR PROCESSING

CROSS-REFERENCE TO RELATED APPLICATIONS

This application is a continuation of U.S. patent application Ser. No. 11/186,154, filed Jul. 20, 2005, which claims the benefit of U.S. Provisional Application No. 60/589,900, filed Jul. 20, 2004, both of which are incorporated by reference herein.

BACKGROUND

1. Field

The embodiments described herein relate generally to motion vector processing, and more particularly, to a method and apparatus for fixed block-size and variable block-size motion vector processing, content adaptive motion vector smoothing, motion vector scaling, motion vector labeling, motion vector classification, and video processing.

2. Background

Low bitrate video compression is very important in many multimedia applications such as wireless video streaming and video telephony due to both the limited bandwidth resources and the variability of available bandwidth. Bandwidth adaptation of video coding at low bitrates can be accomplished by reducing the temporal resolution. In other words, instead of compressing and sending a thirty (30) frame per second (fps) bit-stream, the temporal resolution can be halved to fifteen (15) fps to reduce the transmission bit-rate. However, the consequence of reducing temporal resolution is the introduction of temporal domain artifacts, such as motion jerkiness, that significantly degrades the visual quality of the decoded video.

To display the full frame rate at the receiver side, a recovery mechanism, called frame rate up conversion (FRUC), is needed to re-generate the skipped frames and to reduce temporal artifacts. Generally, the FRUC process is the process of video interpolation to create additional frames at the video decoder to increase the perceived frame rate of the (reconstructed) video. Typically, each frame is divided into specific graphics elements such as individual pixels or blocks of pixels referred to as "macro blocks." Motion vectors, which describes the movement of these elements from one reference frame to the next, are used to predict the position of each element on an interpolated frame between the two reference frames. The creation and processing of the group of motion vectors for a particular frame, which are referred to as a motion vector field or motion field, is an important part of achieving a reconstructed video stream with a desired quality within particular processing boundaries. However, without proper processing of the motion field, which includes the elimination of outlier motion vectors—i.e., motion vectors that do not accurately describe the movement of the graphical elements, the quality of the reconstructed video will be significantly reduced.

SUMMARY

The embodiments described herein provide a motion vector processing system to assist in the creation of interpolated frames, referred to herein as "F-frames," with higher quality in a frame rate up conversion (FRUC) process.

In one embodiment, a method for processing a plurality of motion vectors for a video frame is described. The method includes determining a number of different block sizes in the video frame; and performing a variable block size motion vector process if the number of different block sizes in the video frame is greater than one. Further, the variable block size motion vector process includes constructing a pyramid of motion vectors from the plurality of motion vectors, the pyramid having at least a first layer and a second layer of motion vectors, each of the first and second layers having a set of motion vectors based on a particular block size.

In another embodiment, a computer readable medium having instructions stored thereon is provided for causing a computer to execute a method for processing a plurality of motion vectors for a video frame. The motion vector processing includes determining a number of different block sizes in the video frame. Further, the processing includes performing a variable block size motion vector process if the number of different block sizes in the video frame is greater than one, where the variable block size motion vector process includes constructing a pyramid of motion vectors from the plurality of motion vectors, the pyramid having at least a first layer and a second layer of motion vectors, each of the first and second layers having a set of motion vectors based on a particular block size.

In yet another embodiment, an apparatus is described for processing a plurality of motion vectors for a video frame. The apparatus including a programmable circuit configured to determine a number of different block sizes in the video frame; and, a programmable circuit configured to perform a variable block size motion vector process if the number of different block sizes in the video frame is greater than one. The variable block size motion vector process includes a programmable circuit configured to construct a pyramid of motion vectors from the plurality of motion vectors, the pyramid having at least a first layer and a second layer of motion vectors, each of the first and second layers having a set of motion vectors based on a particular block size.

In still yet another embodiment, a motion vector processor is provided for processing a plurality of motion vectors for a video frame. The motion vector processor includes means for determining a number of different block sizes in the video frame; and, means for performing a variable block size motion vector process if the number of different block sizes in the video frame is greater than one. The means for performing the variable block size motion vector process includes means for constructing a pyramid of motion vectors from the plurality of motion vectors, the pyramid having at least a first layer and a second layer of motion vectors, each of the first and second layers having a set of motion vectors based on a particular block size.

Other objects, features and advantages will become apparent to those skilled in the art from the following detailed description. It is to be understood, however, that the detailed description and specific examples, while indicating exemplary embodiments, are given by way of illustration and not limitation. Many changes and modifications within the scope of the following description may be made without departing from the spirit thereof, and the description should be understood to include all such variations.

BRIEF DESCRIPTION OF THE DRAWINGS

The embodiments described herein may be more readily understood by referring to the accompanying drawings in which.

Like numerals refer to like parts throughout the several views of the drawings.

The embodiments described herein provide methods and apparatus for motion vector processing that assists in the creation of interpolated frames, also referred to as "F-frames," with higher quality in a frame rate up conversion (FRUC) process. The methods and apparatus also extend the functionality of motion vector smoothing for fixed block sizes to apply to variable block sizes. A method of building a hierarchical motion vector pyramid based on different motion block sizes and layered motion vector smoothing techniques is also provided. Moreover, supplementary information contained in the decoded video data are utilized as inputs to the motion vector processor. Supplementary information may include, for example, a description of the type of graphic elements that make up each frame, referred to as "content maps," as well as a description of the complexity and movement of the elements, referred to as "complexity maps" and "activity maps," respectively.

Figure 1:
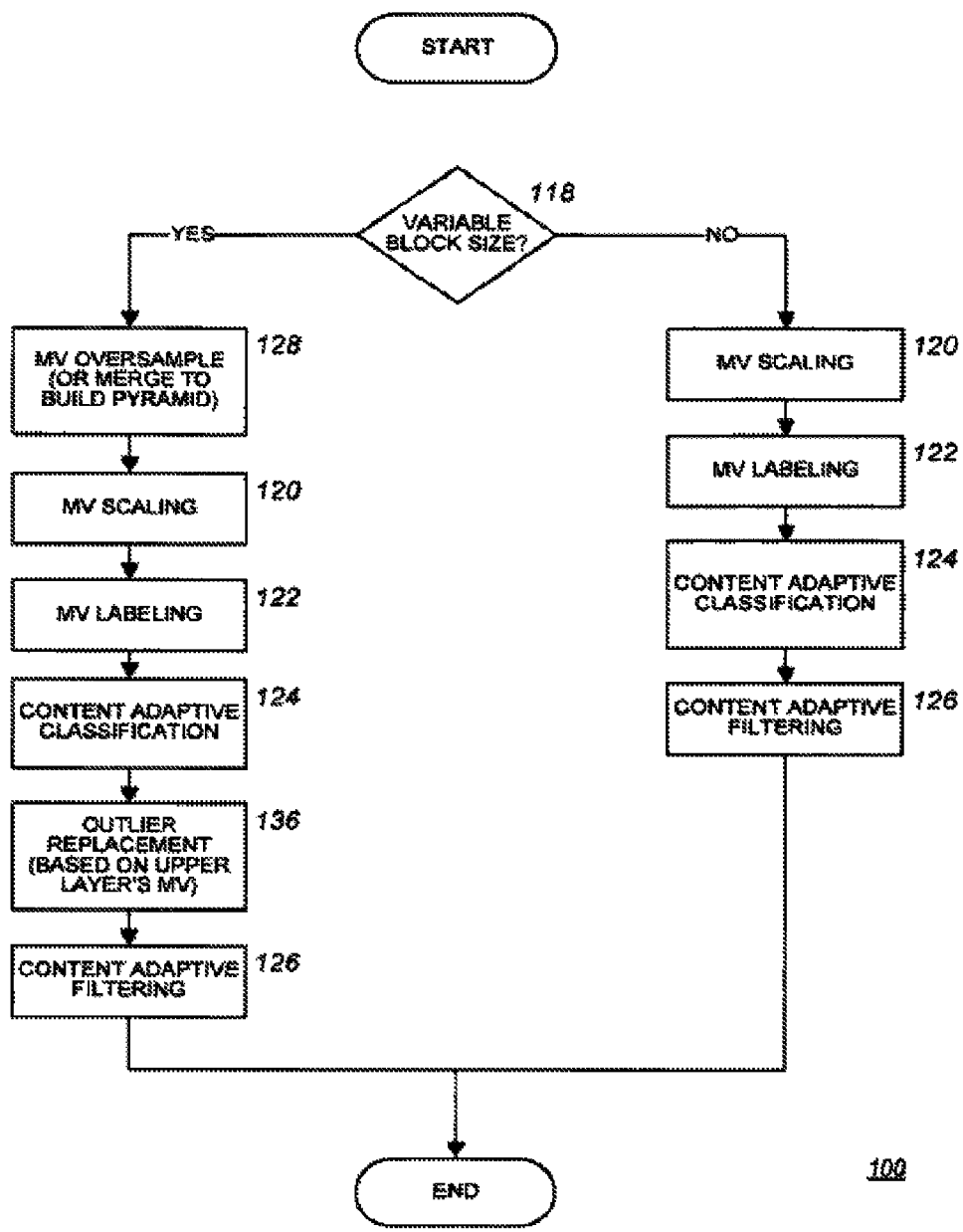
FIG. 1 is a flow diagram of the operation of a motion vector processing system.
Figure 2:
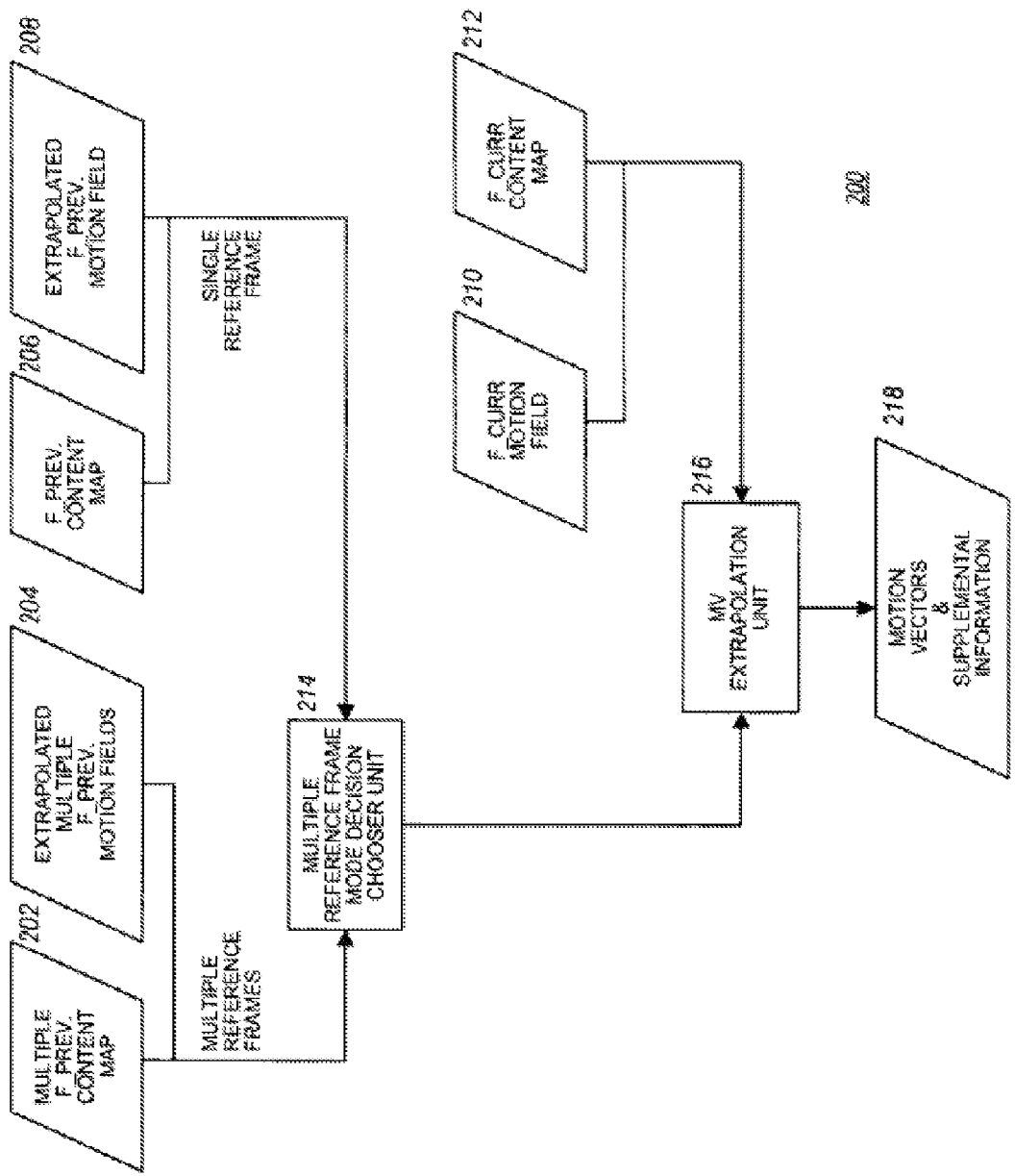
FIG. 2 is a block diagram of a motion vector extraction subsystem of a motion vector processing system.
Figure 3:
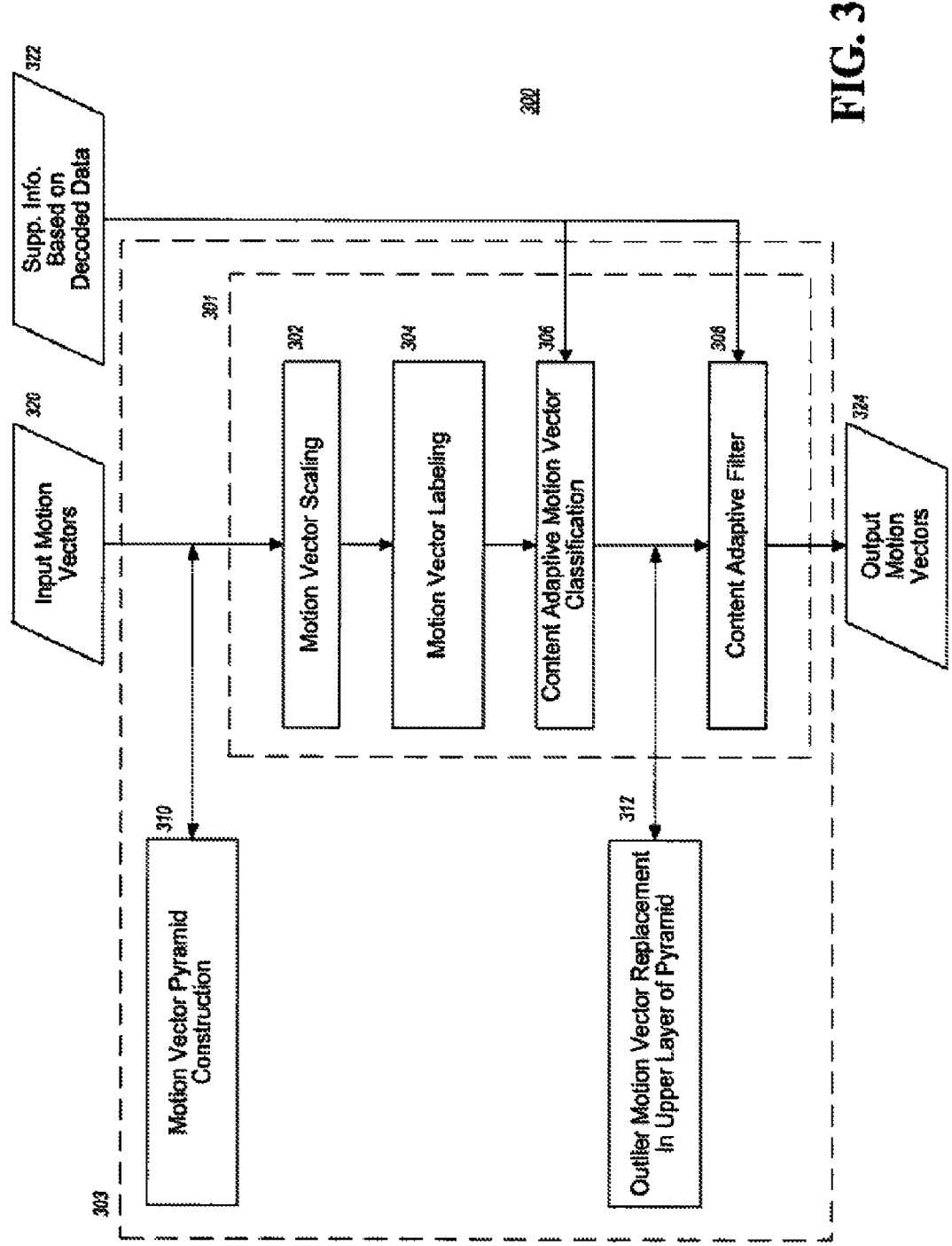
FIG. 3 is a block diagram of a motion vector processor in the motion vector processing system.

FIG. 1 illustrates an exemplary process 100 of operation for a motion vector processing system 300, as shown in FIG. 3, with inputs used in system 300 as detailed in FIG. 2. It should be noted that the functional blocks shown herein correspond to specific modules that may be implemented using one or more software algorithms. The operation of the algorithms is described at a high-level with sufficient detail to allow those of ordinary skill in the art to implement them using a combination of computer hardware and software approaches. For example, the components described herein may be implemented as software executed on a general-purpose computer processor; as "hardwired" circuitry in an Application Specific Integrated Circuit (ASIC); or any combination thereof. It should be noted that various other approaches to the implementation of the modules described herein may be employed and should be within the realm of those of ordinary skill of the art who practice in the vast field of image and video processing.

Further, the inventive concepts described herein may be used in decoder/encoder systems that are compliant with H.26x-standards as promulgated by the International Telecommunications Union, Telecommunications Standardization Sector (ITU-T); or with MPEGx-standards as promulgated by the Moving Picture Experts Group, a working group of the International Standardization Organization/International Electrotechnical Commission, Joint Technical Committee 1 (ISO/IEC JTC1). The ITU-T video coding standards are called recommendations, and they are denoted with H.26x (e.g., H.261, H.262, H.263 and H.264). The ISO/IEC standards are denoted with MPEG-x (e.g., MPEG-1, MPEG-2 and MPEG-4). For example, multiple reference frames and variable block size are special features required for the H.264 standard. In other embodiments, the decoder/encoder systems in which the invention concepts are implemented may be proprietary.

In one embodiment, process 100 operates differently based on different complexity requirements. For example, a high complexity configuration may include multiple reference frames; variable block sizes; previous reference frame motion vector extrapolation with motion acceleration; pyramid layered smoothing; and, motion estimation assisted motion field smoothing In contrast, a low complexity mode of operation may only utilize a single reference frame and fixed block sizes. Other configurations are also valid for different application.

System 300 receives input from a plurality of data storage units in a data subsystem 200 used to store and extract information about the video frames used in the processing. As illustrated in FIG. 2, these storage units include including a multiple previous frames' content maps storage unit (MULTIPLE F_PREV CONTENT MAP) 202; a multiple previous frames' extrapolated motion fields storage unit (EXTRAPOLATED MULTIPLE F_PREV MOTION FIELDS) 204; a single previous frame content map storage unit (F_PREV CONTENT MAP) 206; and a single previous frame extrapolated motion field storage unit (EXTRAPOLATED F_PREV MOTION FIELD) 208. A multiple reference frame mode controller module 214 couples the appropriate storage units to the next stage of input depending on whether system 300 is operating in a mode that utilizes multiple reference frames. Specifically, when system 300 utilizes multiple previous reference frames, the inputs are taken from multiple previous frames' content maps storage unit 202 and multiple previous frames' extrapolated motion fields storage unit 204. For the single previous reference frame mode of operation, the inputs are taken from single previous frame content map storage unit 206 and single previous frame extrapolated motion field storage unit 208.

Although the figure illustrates the use of two different sets of storage units for storing content maps and motion fields—one set for where multiple reference frames are used (i.e., multiple previous frames' content maps storage unit 202 and multiple previous frames' extrapolated motion fields storage unit 204) and another for where a single reference frame is used (i.e., single previous frame content maps storage unit 206 and single previous frame extrapolated motion field storage unit 208), it should be noted that other configurations are possible. For example, the functionality of the two different content map storage units may be combined such that one storage unit may be used to store the content maps for multiple frames or a single content map for a single frame. Further, the storage units may also store data for the current frame as well.

The output from multiple reference frame mode controller module 214 as well as a current frame motion field storage unit (F_CURR MOTION FIELD) 210 and a current frame content map storage unit (F_CURR CONTENT MAP) 212 are fed into a motion vector extrapolation unit 216. Motion vector extrapolation unit 216 extracts the motion vectors as well as the supplemental information used for motion vector processing in system 300, as described herein. Thus, the input motion vectors utilized in system 300 may be from the current frame, or may be from both the current frame and one or more of the previously decoded frames. In addition, the other input to system 300 is side-band information from the decoded frame data, which may include, but is not limited to, the regions of interest, variations in texture information, and variations in luminance background values. This information may provide guidance for motion vector classification and adaptive smoothing algorithms, as further discussed below.

In one embodiment, system 300 can perform motion vector processing in a mode of operation where the macro blocks of a frame to be interpolated (i.e., an F-frame) are of a fixed-size (referred to as "fixed block size motion vector processing"), as well as motion vector processing for block sizes that are variable (referred to as "variable block size motion vector processing"). Each of these modes of operation will be described below, beginning with fixed block size motion vector processing. As illustrated in FIG. 1, it is determined in block 118 whether variable block sizes are used.

Fixed Block-Size Motion Vector Processing

In system 300, fixed block size motion vector processing involves a motion vector scaling stage 120, a motion vector labeling stage 122, a content adaptive motion vector classification stage 124, and a content adaptive filtering stage 126; with each stage performed by respective module shown in FIG. 1.

Motion Vector Scaling

Figure 4:
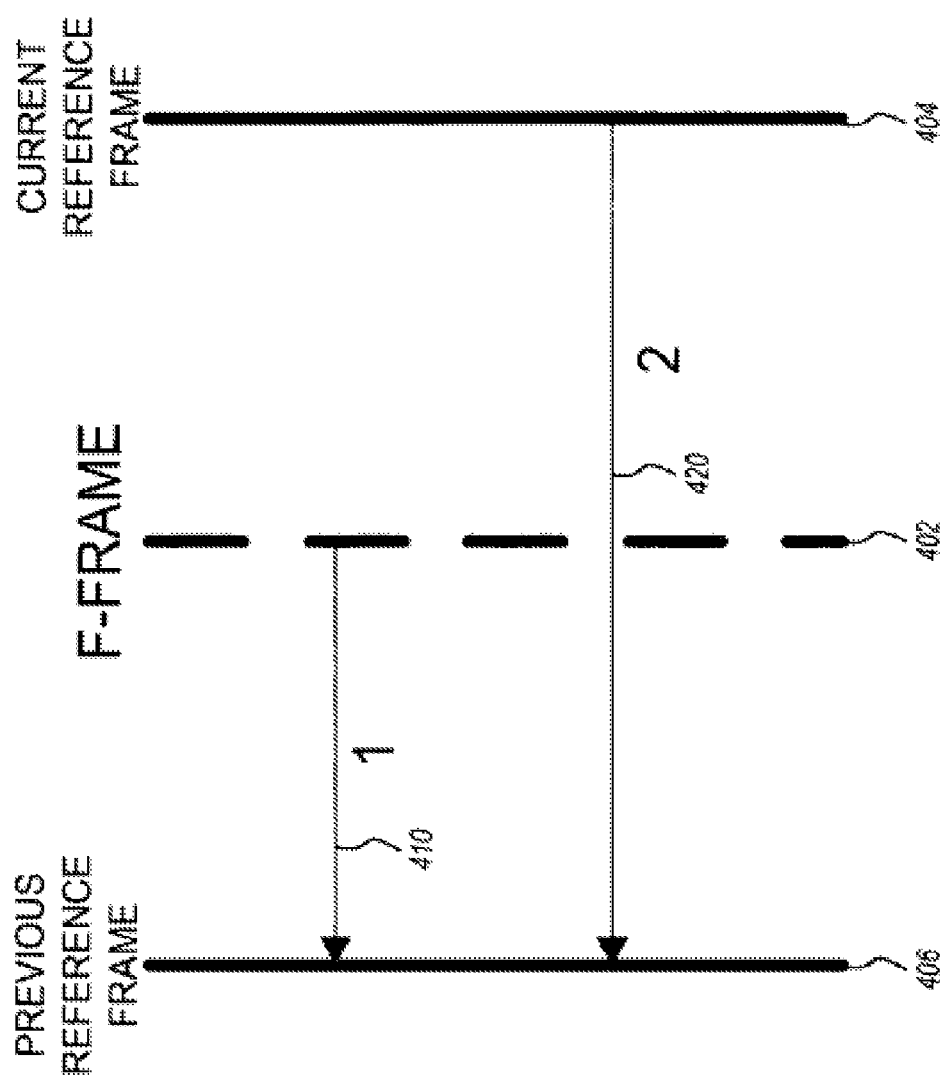
FIG. 4 is a diagram used to describe motion vector scaling for an F-frame.

In one embodiment, the motion vector scaling unit 302 scales the motion vector based on the location of the F-frame (i.e., the frame to be interpolated) with respect to the two received reference frames between which it will be inserted. For example, as shown in FIG. 4, an interpolated F-frame 402 will be inserted between a previous reference frame 406 and a current reference frame 404. In one embodiment, the formulae used to create a scaled motion vector are:

$$MV\_f\_x = MV\_x * n/M;\text{ and,}$$

$$MV\_f\_y = MV\_y * n/M,$$

where MV_x and MV_y are the x-axis and y-axis components of the motion vector as measured from the previous reference frame to the current reference frame; n is the distance in time of the F-frame from the previous reference frame at the chosen insertion point; M is the total distance in time between the previous reference frame to the current reference frame; and MV_f_x and MV_f_y are the calculated x-axis and y-axis components, respectively, of the scaled motion vector.

Continuing to refer to FIG. 4, for a linear macro block motion model (where the macro block is moving at a constant velocity), the scaled motion vector's magnitude is proportional to the current motion vector's magnitude with regards to the distance ratio between: (1) the frame-to-be-interpolated to the previous reference frame (shown by distance 410), and (2) the current reference frame to the previous reference frame (shown by distance 420), while its direction is the same as that of the current frame's motion vector. For a non-linear motion (i.e., motion acceleration) model, the direction and the magnitude of the scaled motion vector depend on both: (1) the distance of the frame-to-be-interpolated between the current reference frame and the previous reference frame, and (2) the calculated motion acceleration.

In the case where there are multiple previous reference frames that are used, the previous reference frame is a reference frame in a reference frame list to which the current motion vector points. Specifically, the references frames in the reference frame list include all the reference frames to which the motion vectors of the current video frame can refer. For example, in one profile as provided by the H.264 standard, the reference frame list includes 5 reference frames. Not all reference frames in the reference frame list may be referred to by the motion vectors of the current video frame. A data structure referred to as a "reference frame set" or a "motion vector reference frame index" identifies the reference frames pointed to by each motion vector in the current video frame. For example, if the current video frame includes three (3) motion vectors, and the notation of (v,f) identifies the reference frame (f) pointed to by each motion vector (v), then an example reference frame set may be:

[(1,4), (2,5), (3,2)]

where motion vector 1 points to reference frame 4, motion vector 2 points to reference frame 5, and motion vector 3 points to reference frame 2 (reference frame 1 being the temporally closest reference frame to the current video frame).

Figure 5:
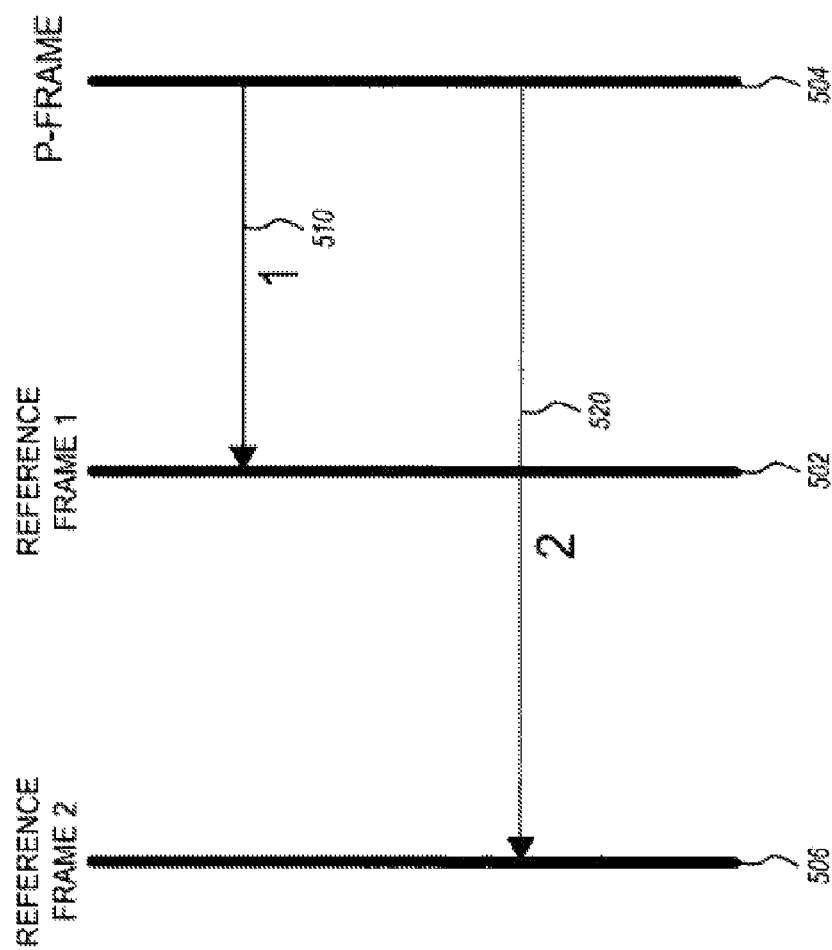
FIG. 5 is a diagram used to describe motion vector scaling for an P-frame.

The concepts described herein may be applied to the processing of motion vectors for actual video frames such as P-frames and B-frames. In this embodiment, the reference frames used would be the temporally closest reference frame in the reference frame list and the reference frame to which the motion vector points. For example, as illustrated in FIG. 5, the scaled motion vector's magnitude is proportional to the current motion vector's magnitude with regards to the distance ratio between: (1) an actual video frame 504 to a first reference frame 502 (shown by distance 510), and (2) actual video frame 504 to a second reference frame 506 (shown by distance 520).

Motion Vector Labeling

Once the motion vector has been scaled, operation continues with motion vector labeling stage 122, where a motion vector labeling module 304 receives and then processes the scaled input motion vector from motion vector scaling unit 302 to label the scaled input motion vector. In one embodiment, depending on the motion vector's content, magnitude, direction and, in the case where multiple reference frames are used, the reference frame to which the motion vector points, the input motion vector is labeled as a particular type of motion vector. Thus, motion vector labeling module 304 is used to the label the motion vectors based on their characteristics so that specific operations may be applied to motion vectors meeting a certain criteria, as discussed below. In one embodiment, the inputs to motion vector labeling module 304 include motion vectors, a motion vector reference frame index (in the case where multiple reference frames are used), content maps, and activity/complexity maps. Given these inputs, the motion vector labeling module 304 will label each motion vector with attributes in one or more of these four areas: a) direction; b) magnitude; c) content; d) reference frame.

Direction Label

With regard to determining the direction label for each motion vector, in one embodiment all input motion vectors are identified as pointing to one of N+1 directional classes, where N is the evenly distributed number of regions that cover a 360 degrees plane. In one embodiment, the number for N is four, and each label is 90 degrees (i.e., 360 degrees/4) apart. Thus, in this case, all input motion vectors may be labeled as one of horizontal_right, vertical_up, horizontal_left, or vertical_down, or zero motion in the directional class. It should be noted that other labels may be used for indicating the direction of the vector. For example, the direction label can be based on the markers on the face of a clock, with 12 o'clock being up, 6 o'clock being down, 3 o'clock being right, 9 o'clock being left, and 0 being zero motion. In another example, if the motion vector is a motion vector pointing to North, then the motion vector is labeled as a North motion vector. In one embodiment, the class includes North, South, West, and East (and combinations thereof), and none (for zero size motion vectors) for direction. In other embodiments, other suitable labels may be used.

Magnitude Label

Based on the complexity and activity maps of the input frame, all input motion vectors can be adaptively labeled based on its motion vector magnitude with one of the following labels: small motion, medium motion or large motion. In one embodiment, the thresholds for the magnitude label is determined adaptively based on the complexity and activity maps of the input frame. For example, the threshold for small motion content may be set to 4-pel, 8-pel for medium motion content, and 16-pel for high-motion content. In another embodiment, a numerical value may be assigned to represent the magnitude of the motion vector, such as 1-10 (with 10 being assigned to the largest magnitude motion vectors, and 1 being assigned to the smallest magnitude motion vectors). Other appropriate classes may be used.

Content Label

The motion vectors are assigned content label based on the content maps of the current frame and reference frame. In one embodiment, each content map may contain 5 types of content:
1. static background (SB);
2. moving object (MO);
3. appearing object AO);
4. disappearing object (DO); and,
5. edges (EDGE).

Thus, the type of region of the frame at which the current motion vector is pointing is analyzed and will affect the processing of the frames that are to be interpolated. The introduction of the EDGE label to the content labels adds an additional label for content identification and provides an improvement in other processing, as described herein.

Figure 6:
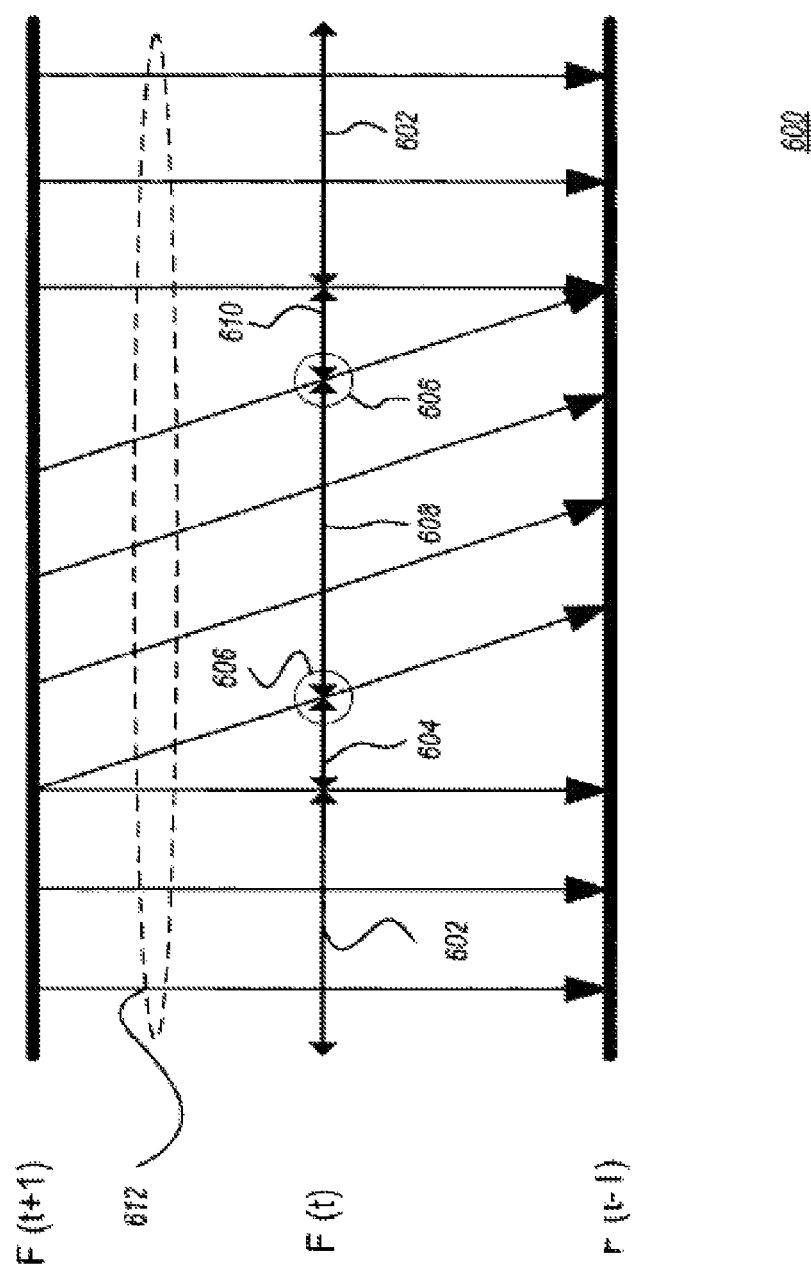
FIG. 6 is a figure illustrating the various classes assigned to pixels inside a video frame; and, FIG. 7 is a block diagram of an access terminal and an access point of a wireless system.

FIG. 6 provides an illustration of the assignment of the above-listed types of regions to the various regions in a particular frame, which is based on an analysis of the change in the status of the region from one frame to another. The figure illustrates a moving object (MO) 608, an appearing object (AO) 604, a disappearing object (DB) 610, a static background (SB) 602 and an edge 606, where a set of arrows 612 denotes the motion trajectory of the pixels in the three illustrated frames: F(t−1), F(t) and F(t+1). Specifically, each pixel or region inside each video frame can be placed into one of the above-listed five types and an associated motion vector may be processed in a particular fashion based on a comparison of the change (if any) in type assignment. For example, as discussed below, if a motion vector that is pointed at a region that is a static background in the previous reference frame but which changes to a moving object in the current frame, the motion vector may be marked as an outlier motion vector. In addition, the above-mentioned five content types can be group into three less-restricted types when the differences between the SB, AO and DO classes are minor:
1. SB 602, AO 604, DO 610;
2. MO 608; and,
3. EDGE 606.

In one embodiment, two different approaches are used to perform the determination of DO, SB, AO and MO content, each based on different computational complexities. In the low-complexity approach, for example, the following formulas may be used to determine content type:

$Qc = abs(Fc[yn][xn] - Fp[yn][xn])$;

$Qp = abs(Fp[yn][xn] - Fpp[yn][xn])$;

$Qc = (Qc > threshold)$; and, $Qp = (Qp > threshold)$;

where:
yn and xn are the y and x coordination positions of the pixel;
Fc is the current frame's pixel value;
Fp is the previous frame's pixel value;
Fpp is the previous-previous frame pixel value;

Qc is the absolute pixel value difference between collocated pixels (located at [yn][xn]) in current- and previous-frames; and, Qp is the absolute pixel value difference between collocated pixels (located at [yn][xn]) in previous- and previous-previous-frames;
and:
if (Qc && Qp) then assign type as moving object;
else if (!Qc && !Qp) then assign type as stationary background;
else if (Qc && !Qp) then assign type as disappearing object;
else if (!Qc && Qp) the assign type as appearing object.

In the high-complexity approach, in one embodiment, the determination is based on object segmentation and morphological operations, with the content type determination being performed by tracing the motion of the segmented object. Thus:
1. perform object segmentation on the motion field;
2. trace the motion of the segmented object (e.g., by morphological operations); and,
3. mark the object as SB, AO, DO, and MO, respectively.

It should be noted that edges characterize boundaries and therefore are of fundamental importance in image processing, especially the edges of moving objects. Edges in images are areas with strong intensity contrasts (i.e., a large change in intensity from one pixel to the next). There are many ways to perform edge detection. However, the majority of the different methods may be grouped into two categories: gradient and Laplacian. The gradient method detects the edges by looking for the maximum and minimum in the first derivative of the image. The Laplacian method searches for zero crossings in the second derivative of the image to find edges. The techniques of the gradient or Laplacian methods, which are one-dimensional, is applied to two-dimensions by the Sobel method.

By assigning the various macroblocks with one of the MO, SB, AO, DO and EDGE classes, all input motion vectors can then be labeled, based on the type(s) of content touched by the motion vector's starting point and ending points, as a MO motion vector (MV), a SB MV, an AO MV, a DO MV or an EDGE MV. In addition, in one embodiment, an additional label of "suspicious MV" is added to the MO MV, SB MV, AO MV, DO MV and EDGE MV labels and a motion vector is labeled as a "suspicious MV" if the motion vector's starting and ending points belong to different content classes.

Reference Frame Index Label

In the case where multiple reference frames are used, each motion vector may point to a different reference frame in the reference frame list. Which reference frame each motion vector points to is tracked in the motion vector reference frame index, as discussed above. In one embodiment, each motion vector that does not refer to the temporally closest reference frame is labeled as a "suspicious" motion vector. In another embodiment, each motion vector that points to a reference frame different from its neighboring motion vector is labeled as a "suspicious" motion vector. Where some, but not all, neighboring motion vectors agree, if there is a majority of the motion vectors that point to the same reference frame, then any motion vector that does not agree with the majority—i.e., any motion vector that does not point to the same reference frame, will be labeled as a "suspicious" motion vector. In other embodiments, a voting system such as the "most votes," where the reference frame with the largest number of neighboring motion vectors pointing to it is considered the reference frame to which a neighboring motion vector must point for that motion vector to not be labeled as "suspicious," or other voting-type mechanisms may be used. As described below, in one embodiment, any motion vector having a "suspicious" reference frame index label will be classified as an outlier motion vector. In other embodiments, instead of being labeled as "suspicious," a motion vector may be directly labeled as an outlier motion vector.

Once the motion vector has been labeled using one or more of the above labels, operation continues with motion vector classification stage 124 as performed by a motion vector classification module 306.

Motion Vector Classification

After motion vector labeling module 304 has labeled each motion vector, motion vector classification module 306 will perform classification of the motion vector by determining if it is an outlier motion vector. In one embodiment, the motion vector classification module 306 determines if the input motion vector is an outlier vector based on its label information (as assigned by motion vector labeling module 304), including the content information from a decoded data storage unit 222, as described above. Specifically, the classification can be conducted by a threshold operation based on the motion vector's direction, magnitude, content and/or reference frame index (where multiple reference frames are used) labels. In one embodiment, the magnitude and direction of the current motion vector may be compared to the magnitude and direction of other motion vectors surrounding the current vector. For example, if the current motion vector is labeled as a small vertical_down motion vector (i.e., a small magnitude motion vector pointed down), while its neighboring motion vectors are labeled as large vertical_up motion vectors (i.e., a large magnitude motion vector pointed up), then the current motion vector is marked as an outlier motion vector.

In one embodiment, a majority voting mechanism is used to determine if a motion vector is an outlier motion vector. For example, if there are three classes (e.g., low, medium and high) of magnitudes, and four classes (e.g., south, east, west, and north) of directions, then there is a total of twelve (3 magnitude by 4 direction classes) possible variations of motion vector class combinations. Further, given a smoothing window with a 3×3 size, if the majority of the motion vectors are of a certain class combination (e.g., five motion vectors have a high magnitude and point south), and the current motion vector's class combination is different from the class combination of this majority, then the current motion vector is labeled as an outlier. Many methods may be used to determine whether a an outlier motion vector. For example, a simple sorting algorithm may be used to sort the nine (9) motion vectors in a 3×3-sized window.

In another embodiment, a single attribute alone may be used to determine if a motion vector is an outlier. For example, if the motion vector's content attribute (i.e., label) indicates that the motion vector is a "suspicious MV," while the content labels of its neighboring motion vectors are of another single type, then that particular motion vector can be classified as an outlier because its content attribute is different from the content attributes of its neighbors. In another example, if a motion vector has been labeled as "suspicious" as it points to a reference frame that is not the temporally closest reference frame (i.e., the first embodiment described in the reference frame index label section, above), or it points to a reference frame different from the reference frame pointed to by a majority of its neighboring motion vectors (i.e., the second embodiment described in the reference frame index label section, above), then the motion vector will be classified as an outlier motion vector.

Once the motion vector has been classified based on one or more of its labels, operation continues with content adaptive filtering stage 126 as performed by a content adaptive filter (smoothing) module 308.

Content Adaptive Filtering

The content information from the decoded data and labeling of the motion vector provide the needed inputs for an adaptive window size selection algorithm in a content adaptive filtering module 308. The removal of outlier motion vector(s) from the previous processing is performed based on the selected processing window. Content adaptive filtering module 308, in one embodiment, processes the motion vector in three stages:

1. Select content adaptive filter window size: based on the content or the block size, a 3×3 or 5×5 sized operation window, which refers to a portion of interest of a frame, is selected. In one embodiment, a 3×3 window size is selected where the block has a block size of 16×16 while a 5×5 window size is selected where the block size is 8×8. The rational behind the selection is based on a statistical analysis of a moving object from the most common video content, and of the size of a window that will just cover a moving object. In one embodiment, a window size should be large enough to entirely cover a moving object. Thus, if the window size is too small for a small block-size, it may only cover a portion of a moving object, and the same logic holds for the large block-size case. Where the window size is selected based on video content, a 3×3 window size is selected where there is detailed content, while a 5×5 window size is used for smooth (less detailed) areas. Thus, in general, it is more desirable to use a smaller window size for more detailed areas.

2. Replace outlier motion vectors: perform a median operation of the motion vectors within the operation window.

3. Smooth motion vector field: a low-pass filtering operation is performed within the operation window. In one embodiment, a suitable low-pass filter is an averaging filter [1/N, 1/N, . . . 1/N], where N is the window size.

In one embodiment, the smoothing method implemented in content adaptive smoothing filter 308 is a median operation. In other embodiments, the median operation can be replaced by a mean (average) or Gaussian type filtering operation. Further, other type of linear/non-linear filters may be used.

Variable Block Size Motion Vector Processing

In a fixed block size system, a frame must be divided into blocks of one fixed size. However, in a system that supports variable block sizes, a frame may be divided into blocks that have different sizes and shapes. For video codecs that support variable block sizes, system 300 can also perform motion vector processing for the motion vectors associated with these blocks. One such standard is the H.264 standard, as mentioned above, which supports block sizes of 16×16, 16×8, 8×16, 8×8, 8×4, 4×8, and 4×4.

In one embodiment, the approach used for motion vector processing in the variable block-size mode is similar to the fixed block-size mode. Accordingly, referring again to FIG. 1, the process for the variable block-size motion vector processing mode includes motion vector scaling stage 120; motion vector labeling stage 122; content adaptive motion vector classification stage 124 and content adaptive filtering stage 126 implemented using the corresponding modules of FIG. 3 as described for the fixed block size mode. However, there are aspects of the process for variable block-size motion vector processing that are different from the process for fixed block size motion vector processing. One distinguishing feature, for example, is the construction of a "pyramid" of motion vectors of different block sizes, and performing a motion vector smoothing operation for a layer within the pyramid that is higher than the current layer. Another distinguishing feature is the modification of the operation of the content adaptive filter module 308 to be able to process the motion vectors of each layer, as described below.

The building of the pyramid using a content adaptive approach is provided by a motion vector pyramid construction module 310 and the modification of the filter to use the smoothed motion vector from an upper layer of a pyramid to replace the outlier motion vectors of the current layer is provided by use of an outlier motion vector replacement module 312 to modify.

Pyramid Construction

One possible approach to implementing the construction of each pyramid is as follows:

1. The input motion vectors (i.e., the variable block-size motion vectors) is first over-sampled to a particular granularity (e.g., 4×4) to create level 1 of the pyramid. The oversampling ensures that the first layer of the pyramid is composed of the smallest block size of the block sizes used.

2. Level 2 of the pyramid is built by merging the corresponding 4×4 motion vectors in level 1. For instance, if the motion vector granularity in level 2 is 8×8, one 8×8 motion vector in level 2 corresponds to four of the 4×4 motion vectors in level 1. In one embodiment, the merging operation may be either an averaging or median operation, with the median operation being more.

3. To build level 3 of the pyramid from level 2, repeat the approaches of steps 1 and 2, as appropriately modified for the larger sizes of levels 2 and 3.

For example, in the H.264 standard, the block size may be one of seven shapes and, consequently, up to nine 3-level pyramids may be constructed, with each level composed of motion vectors for block sizes of different granularity. Specifically, the macroblocks in each frame may be subdivided into smaller blocks using the seven block sizes described above, which results in variability of block sizes within each frame. In one embodiment, as applied to the H.264 standard, level 1 of the pyramid is always built of motion vectors for 4×4 blocks; level 2 of the pyramid is built of motion vectors from one of the following three types of blocks: 8×8, 8×4, or 4×8; and, level 3 of the pyramid is built from the motion vectors of one of the following three types of blocks: 16×16, 16×8, or 8×16. Thus, there are nine possible combinations of the various sizes.

Content Adaptive Pyramid

A pyramid for each frame may also be created based on the frame's content. In one embodiment, the content adaptive pyramid is constructed in two stages:

1. Adaptively determine the size/shape of the blocks used for the lowest level of the pyramid, based on either content classifications or complexity map or a combination thereof For example, a frame that has very high complexity may use smaller block sizes.

2. If the level of the pyramid from step 1 is not comprised of the largest block size available (e.g., 16×16 or 8×8 blocks), an additional level is built on top of the level from step 1. The shape of the block for the motion vector is of a default shape. For example, the default shape used for level 3 is 16×16 and 8×8 for level 2.

Outlier Replacement Using Motion Vectors from a Higher Level of the Pyramid

In an outlier motion vector replacement stage 136, an outlier motion vector replacement module 312 enables support of a pyramid model with layers having motion vector for variable block sizes. In one embodiment, the replacement of outlier motion vectors using this approach is as follows:

1. Perform motion vector scaling, motion vector labeling and motion vector classification on the motion vectors of the current level of the pyramid (determined by content maps);

2. If a higher level of the pyramid is available, perform a full set of motion vector processing (smoothing) operations on the motion vectors of this higher level (e.g., motion vector scaling, motion vector labeling, motion vector classification and motion vector filtering); and, 3. replacing the outlier motion vector(s) by a corresponding higher-level smoothed motion vector.

Thus, when an outlier is identified and if an upper-level of the pyramid is available, then the outlier is replaced with a corresponding collocated motion vector in the upper layer. Otherwise, a median operation is performed on the motion vectors within the operation window.

It should be noted that the motion vector inputs may come from several sources. In one, the input motion vectors come from the motion vectors of the current decoded frame. In another embodiment, the input motion vectors come from both the current frame and one or more of the previously decoded frames. For example, by combining the current frame's motion vectors and previous frames' motion vectors, the constant motion model can be extended to include motion acceleration, which may provide more accurate motion trajectory creation for the F-frame. When a previous frame's motion vector is reversed (being a so-called extrapolated motion vector), the reversed motion vector will point from previous frame to the current frame, and it will be used as the backward motion vector. If the motion is constant, the backward motion vector and the forward motion vector (the current frame's motion vector) should be aligned with each other and pointing in opposite directions. If the forward and backward motion vectors are not aligned, the difference is assumed to be caused by motion acceleration.

As discussed above, motion vector scaling module 302 performs the scaling of an input motion vector based on the distance of the frame-to-be-interpolated between the current and previous frames, and the calculated motion acceleration model. In addition to the scaling function, in another embodiment motion vector scaling module 302 may include a merging function that merges several small block-size motion vectors into a larger block size motion vector. Although the size of the shape that is arrived at after the merging function is content dependent, in one embodiment, an 8×8 block size is used for the merging function. In one embodiment, the merging function is implemented as an average function. In another embodiment, the merging function is implemented as a median function. In yet another embodiment, the merging function is implemented as a weighted sum function. In still yet other embodiments, different functions may be combined to implement the merging function.

The inventive concepts described herein are also applicable to encoder assisted FRUC (EA-FRUC), where an encoder is configured to send extra information to assist a decoder FRUC module on a client. For example, the encoder can send motion vectors, coefficient residue, or FRUC instructions for "difficult" (with respect to FRUC operations) macroblocks to the decoder FRUC module.

FIG. 7 shows a block diagram of an access terminal 702x and an access point 704x in a wireless system. An "access terminal," as discussed herein, refers to a device providing voice and/or data connectivity to a user. The access terminal may be connected to a computing device such as a laptop computer or desktop computer, or it may be a self contained device such as a personal digital assistant. The access terminal can also be referred to as a subscriber unit, mobile station, mobile, remote station, remote terminal, user terminal, user agent, or user equipment. The access terminal may be a subscriber station, wireless device, cellular telephone, PCS telephone, a cordless telephone, a Session Initiation Protocol (SIP) phone, a wireless local loop (WLL) station, a personal digital assistant (PDA), a handheld device having wireless connection capability, or other processing device connected to a wireless modem. An "access point," as discussed herein, refers to a device in an access network that communicates over the air-interface, through one or more sectors, with the access terminals. The access point acts as a router between the access terminal and the rest of the access network, which may include an IP network, by converting received air-interface frames to IP packets. The access point also coordinates the management of attributes for the air interface.

For the reverse link, at access terminal 702x, a transmit (TX) data processor 714 receives traffic data from a data buffer 712, processes (e.g., encodes, interleaves, and symbol maps) each data packet based on a selected coding and modulation scheme, and provides data symbols. A data symbol is a modulation symbol for data, and a pilot symbol is a modulation symbol for pilot (which is known a priori). A modulator 716 receives the data symbols, pilot symbols, and possibly signaling for the reverse link, performs (e.g., OFDM) modulation and/or other processing as specified by the system, and provides a stream of output chips. A transmitter unit (TMTR) 718 processes (e.g., converts to analog, filters, amplifies, and frequency upconverts) the output chip stream and generates a modulated signal, which is transmitted from an antenna 720.

At access point 704x, the modulated signals transmitted by access terminal 702x and other terminals in communication with access point 704x are received by an antenna 752. A receiver unit (RCVR) 754 processes (e.g., conditions and digitizes) the received signal from antenna 752 and provides received samples. A demodulator (Demod) 756 processes (e.g., demodulates and detects) the received samples and provides detected data symbols, which are noisy estimate of the data symbols transmitted by the terminals to access point 704x. A receive (RX) data processor 758 processes (e.g., symbol demaps, deinterleaves, and decodes) the detected data symbols for each terminal and provides decoded data for that terminal.

For the forward link, at access point 704x, traffic data is processed by a TX data processor 760 to generate data symbols. A modulator 762 receives the data symbols, pilot symbols, and signaling for the forward link, performs (e.g., OFDM) modulation and/or other pertinent processing, and provides an output chip stream, which is further conditioned by a transmitter unit 764 and transmitted from antenna 752. The forward link signaling may include power control commands generated by a controller 770 for all terminals transmitting on the reverse link to access point 704x. At access terminal 702x, the modulated signal transmitted by access point 704x is received by antenna 720, conditioned and digitized by a receiver unit 722, and processed by a demodulator 724 to obtain detected data symbols. An RX data processor 726 processes the detected data symbols and provides decoded data for the terminal and the forward link signaling. Controller 730 receives the power control commands, and controls data transmission and transmit power on the reverse link to access point 704x. Controllers 730 and 770 direct the operation of access terminal 702x and access point 704x, respectively. Memory units 732 and 772 store program codes and data used by controllers 730 and 770, respectively.

The disclosed embodiments may be applied to any one or combinations of the following technologies: Code Division Multiple Access (CDMA) systems, Multiple-Carrier CDMA (MC-CDMA), Wideband CDMA (W-CDMA), High-Speed Downlink Packet Access (HSDPA), Time Division Multiple Access (TDMA) systems, Frequency Division Multiple Access (FDMA) systems, and Orthogonal Frequency Division Multiple Access (OFDMA) systems.

It should be noted that the methods described herein may be implemented on a variety of communication hardware, processors and systems known by one of ordinary skill in the art. For example, the general requirement for the client to operate as described herein is that the client has a display to display content and information, a processor to control the operation of the client and a memory for storing data and programs related to the operation of the client. In one embodiment, the client is a cellular phone. In another embodiment, the client is a handheld computer having communications capabilities. In yet another embodiment, the client is a personal computer having communications capabilities. In addition, hardware such as a GPS receiver may be incorporated as necessary in the client to implement the various embodiments. The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium is coupled to the processor, such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

A computer readable medium having instructions stored thereon for causing a computer to execute a method for processing a plurality of motion vectors for a video frame, the method comprising determining a number of different block sizes in the video frame, and performing a variable block size motion vector process if the number of different block sizes in the video frame is greater than one, the variable block size motion vector process comprising constructing a pyramid of motion vectors from the plurality of motion vectors, the pyramid having at a first layer and a second layer of motion vectors, each of the first and second layers having a set of motion vectors based on a particular block size. The method for processing the plurality of motion vectors may further comprise performing a fixed block size motion vector process if the number of different block sizes in the video frame is less than two, the fixed block size motion vector process may further comprise: scaling the plurality of motion vectors, attaching a label to each motion vector in the plurality of motion vectors, determining a classification of each motion vector, and filtering the plurality of motion vectors based on the classification of each motion vector. The constructing of the pyramid of motion vectors from the plurality of motion vectors may comprise oversampling the plurality of motion vectors to create the first layer of motion vectors at a first predetermined block size granularity. The constructing of the pyramid of motion vectors from the plurality of motion vectors may comprise merging at least two of the motion vectors from the set of motion vectors in the first layer of motion vectors to create the second layer of motion vectors at a second predetermined granularity, the second predetermined block size granularity being greater than the first predetermined block size granularity. The merging of at least two of the motion vectors from the set of motion vectors in the first layer of motion vectors may comprise performing an averaging operation on at least two of the motion vectors from the set of motion vectors in the first layer of motion vectors. The merging of at least two of the motion vectors from the set of motion vectors in the first layer of motion vectors may comprise performing a median operation on at least two of the motion vectors from the set of motion vectors in the first layer of motion vectors. Each of the of the plurality of motion vectors may include a magnitude, and scaling the plurality of motion vectors may comprise: calculating a ratio of: (i) a first distance between the video frame to a first reference frame, and (ii) a second distance between the reference frame to a second reference frame, and scaling each motion vector by adjusting the magnitude of the motion vector based on the ratio of the first distance and the second distance. The video frame may be a frame to be interpolated, the first reference frame may be a current frame and the second reference frame may be a reference frame to which the motion vector points. The video frame may be an actual video frame, the first reference frame may be a temporally closest frame and the second reference frame may be a reference frame to which the motion vector points. The attaching the label to each motion vector in the plurality of motion vectors may comprise determining at least one of a content, a magnitude, a direction and a reference frame index characteristic of each motion vector in the plurality of motion vectors, and assigning a label to each motion vector based on one or more of the determined characteristics. The determining at least one of the content, the magnitude, the direction and the reference frame index characteristic of each motion vector in the plurality of motion vectors may comprise for each motion vector, determine a starting content type for a starting point of the motion vector and an ending content type for an ending point of the motion vector. The assigning the label to each motion vector based on one or more of the determined characteristics may comprise: if the starting content type of the motion vector is not the same as the ending content type of the motion vector, then labeling the motion vector as a suspicious motion vector. Each motion vector may be associated with a group of neighboring motion vectors, and the determining the classification of each motion vector may comprise examining at least one characteristic of each motion vector, comparing the at least one characteristic with an aggregate characteristic of the group of neighboring motion vectors, and classifying each motion vector as an outlier motion vector if the difference between the at least one characteristic and the aggregate characteristic of the group of neighboring motion vectors is above a predetermined threshold. The filtering the plurality of motion vectors based on the classification of each motion vector may comprise selecting an operation window, the operation window having a size based on a selected one of a content type and a block size, replacing each motion vector classified as an outlier motion vector in the operation window, and performing a smoothing operation within the operation window. The replacing each motion vector classified as an outlier motion vector in the operation window may comprise performing one of a median operation, a mean operation, and a Gaussian-type filter operation in the operation window. The performing the smoothing operation within the operation window may comprise performing a low pass filter operation in the operation window.

A method for processing a plurality of motion vectors for a video frame may comprise determining a number of different block sizes in the video frame, and performing a variable block size motion vector process if the number of different block sizes in the video frame is greater than one, the variable block size motion vector process comprising constructing a pyramid of motion vectors from the plurality of motion vectors, the pyramid having at least a first layer and a second layer of motion vectors, each of the first and second layers having a set of motion vectors based on a particular block size. The method may further comprise performing a fixed block size motion vector process if the number of different block sizes in the video frame is less than two, where the fixed block size motion vector process may comprise scaling the plurality of motion vectors, attaching a label to each motion vector in the plurality of motion vectors, determining a classification of each motion vector, and filtering the plurality of motion vectors based on the classification of each motion vector. The constructing of the pyramid of motion vectors from the plurality of motion vectors may comprise oversampling the plurality of motion vectors to create the first layer of motion vectors at a first predetermined block size granularity. The constructing of the pyramid of motion vectors from the plurality of motion vectors may comprise merging at least two of the motion vectors from the set of motion vectors in the first layer of motion vectors to create the second layer of motion vectors at a second predetermined granularity, the second predetermined block size granularity being greater than the first predetermined block size granularity. The merging of at least two of the motion vectors from the set of motion vectors in the first layer of motion vectors may comprise performing an averaging operation on at least two of the motion vectors from the set of motion vectors in the first layer of motion vectors. The merging of at least two of the motion vectors from the set of motion vectors in the first layer of motion vectors may comprise performing a median operation on at least two of the motion vectors from the set of motion vectors in the first layer of motion vectors. Each motion vector in the plurality of motion vectors may have a magnitude and the scaling of the plurality of motion vectors may comprise calculating a ratio of: (i) a first distance between the video frame to a first reference frame, and (ii) a second distance between the reference frame to a second reference frame, and scaling each motion vector by adjusting the magnitude of the motion vector based on the ratio of the first distance and the second distance. The video frame may be a frame to be interpolated, the first reference frame may be a current frame and the second reference frame may be a reference frame to which the motion vector points. The video frame may be an actual video frame, the first reference frame may be a temporally closest frame and the second reference frame may be a reference frame to which the motion vector points. The attaching the label to each motion vector in the plurality of motion vectors may comprise determining at least one of a content, a magnitude, a direction, and a reference frame index characteristic of each motion vector in the plurality of motion vectors, and assigning a label to each motion vector based on one or more of the determined characteristics. The determining at least one of the content, the magnitude, the direction and the reference frame index characteristic of each motion vector in the plurality of motion vectors may comprise: for each motion vector, determine a starting content type for a starting point of the motion vector and an ending content type for an ending point of the motion vector. The assigning the label to each motion vector based on one or more of the determined characteristics may comprise: if the starting content type of the motion vector is not the same as the ending content type of the motion vector, then labeling the motion vector as a suspicious motion vector. Each motion vector may be associated with a group of neighboring motion vectors, and determining the classification of each motion vector may comprise examining at least one characteristic of each motion vector, comparing the at least one characteristic with an aggregate characteristic of the group of neighboring motion vectors, and classifying each motion vector as an outlier motion vector if the difference between the at least one characteristic and the aggregate characteristic of the group of neighboring motion vectors is above a predetermined threshold. The filtering of the plurality of motion vectors based on the classification of each motion vector may comprise selecting an operation window, the operation window having a size based on a selected one of a content type and a block size, replacing each motion vector classified as an outlier motion vector in the operation window, and performing a smoothing operation within the operation window. The replacing of each motion vector classified as an outlier motion vector in the operation window may comprise performing one of a median operation, a mean operation, and a Gaussian-type filter operation in the operation window. The performing of a smoothing operation within the operation window may comprise performing a low pass filter. operation in the operation window.

An apparatus for processing a plurality of motion vectors for a video frame may comprise a programmable circuit configured to determine a number of different block sizes in the video frame, and a programmable circuit configured to perform a variable block size motion vector process if the number of different block sizes in the video frame is greater than one, the programmable circuit configured to perform the variable block size motion vector process comprising a programmable circuit configured to construct a pyramid of motion vectors from the plurality of motion vectors, the pyramid having at least a first layer and a second layer of motion vectors, each of the first and second layers having a set of motion vectors based on a particular block size. The apparatus may further comprise: a programmable circuit configured to perform a fixed block size motion vector process if the number of different block sizes in the video frame is less than two, the programmable circuit configured to perform the fixed block size motion vector process comprising: a programmable circuit configured to scale the plurality of motion vectors, a programmable circuit configured to attach a label to each motion vector in the plurality of motion vectors, a programmable circuit configured to determine a classification of each motion vector, and a programmable circuit configured to filter the plurality of motion vectors based on the classification of each motion vector. The programmable circuit configured to construct the pyramid of motion vectors from the plurality of motion vectors may comprise a programmable circuit configured to oversample the plurality of motion vectors to create the first layer of motion vectors at a first predetermined block size granularity. The programmable circuit configured to construct the pyramid of motion vectors from the plurality of motion vectors may comprise a programmable circuit configured to merge at least two of the motion vectors from the set of motion vectors in the first layer of motion vectors to create the second layer of motion vectors at a second predetermined block size granularity, the second predetermined block size granularity being greater than the first predetermined block size granularity. The programmable circuit configured to construct the pyramid of motion vectors from the plurality of motion vectors may comprise a programmable circuit configured to average at least two of the motion vectors from the set of motion vectors in the first layer of motion vectors. The programmable circuit configured to construct the pyramid of motion vectors from the plurality of motion vectors may comprise a programmable circuit configured to perform a median operation on at least two of the motion vectors from the set of motion vectors in the first layer of motion vectors. Each motion vector in the plurality of motion vectors may have a magnitude, and a programmable circuit configured to scale the plurality of motion vectors may comprise a programmable circuit configured to calculate a ratio of: (i) a first distance between the video frame to a first reference frame, and (ii) a second distance between the reference frame to a second reference frame, and a programmable circuit configured to scale each motion vector by adjusting the magnitude of the motion vector based on the ratio of the first distance and the second distance. The programmable circuit configured to attach the label to each motion vector in the plurality of motion vectors may comprise a programmable circuit configured to determine at least one of a content, a magnitude, a direction, and a reference frame index characteristic of each motion vector in the plurality of motion vectors, and a programmable circuit configured to assign a label to each motion vector based on one or more of the determined characteristics. The programmable circuit configured to determine at least one of the content, the magnitude, the direction and the reference frame index characteristic of each motion vector in the plurality of motion vectors may comprise a programmable circuit configured to determine, for each motion vector, a starting content type for a starting point of the motion vector and an ending content type for an ending point of the motion vector. The programmable circuit configured to assign the label to each motion vector based on one or more of the determined characteristics may comprise a programmable circuit configured to label the motion vector as a suspicious motion vector if the starting content type of the motion vector is not the same as the ending content type of the motion vector. Each motion vector may be associated with a group of neighboring motion vectors, and the processing circuit configured to determine the classification of each motion vector may comprise a programmable circuit configured to examine at least one characteristic of each motion vector, a programmable circuit configured to compare at least one characteristic with an aggregate characteristic of the group of neighbor motion vectors, and a programmable circuit configured to classify each motion vector as an outlier motion vector if the difference between the at least one characteristic and the aggregate characteristic of the group of neighbor motion vectors is above a predetermined threshold. The programmable circuit configured to filter the plurality of motion vectors based on the classification of each motion vector may comprise a programmable circuit configured to select an operation window, the operation window having a size based on a selected one of a content type and a block size, a programmable circuit configured to replace each motion vector classified as an outlier motion vector in the operation window, and a programmable circuit configured to perform a smoothing operation within the operation window. The programmable circuit configured to replace each motion vector classified as an outlier motion vector in the operation window may comprise a programmable circuit configured to perform one of a median operation, a mean operation, and a Gaussian-type filter operation in the operation window. The programmable circuit configured to perform the smoothing operation within the operation window may comprise a programmable circuit configured to perform a low pass filter operation in the operation window.

A motion vector processor for processing a plurality of motion vectors for a video frame may comprise means for determining a number of different block sizes in the video frame, and means for performing a variable block size motion vector process if the number of different block sizes in the video frame is greater than one, the means for performing the variable block size motion vector process comprising means for constructing a pyramid of motion vectors from the plurality of motion vectors, the pyramid having at least a first layer and a second layer of motion vectors, each of the first and second layers having a set of motion vectors based on a particular block size. The motion vector processor may further comprise means for performing a fixed block size motion vector process if the number of different block sizes in the video frame is less than two, the means for performing the fixed block size motion vector process may comprise means for scaling the plurality of motion vectors, means for attaching a label to each motion vector in the plurality of motion vectors, means for determining a classification of each motion vector, and means for filtering the plurality of motion vectors based on the classification of each motion vector. The means for constructing the pyramid of motion vectors from the plurality of motion vectors may comprise means for oversampling the plurality of motion vectors to create the first layer of motion vectors at a first predetermined block size granularity. The means for constructing the pyramid of motion vectors from the plurality of motion vectors may comprise means for merging at least two of the motion vectors from the set of motion vectors in the first layer of motion vectors to create the second layer of motion vectors at a second predetermined block size granularity, the second predetermined block size granularity being greater than the first predetermined block size granularity. The means for merging at least two of the motion vectors from the set of motion vectors in the first layer of motion vectors may comprise means for performing an averaging operation on at least two of the motion vectors from the set of motion vectors in the first layer of motion vectors. The means for merging at least two of the motion vectors from the set of motion vectors in the first layer of motion vectors may comprise means for performing a median operation on at least two of the motion vectors from the set of motion vectors in the first layer of motion vectors. Each motion vector in the plurality of motion vectors may have a magnitude, and the means for scaling the plurality of motion vectors may comprise means for calculating a ratio of: (i) a first distance between the video frame to a first reference frame, and (ii) a second distance between the reference frame to a second reference frame, and means for scaling each motion vector by adjusting the magnitude of the motion vector based on the ratio of the first distance and the second distance. The means for attaching a label to each motion vector in the plurality of motion vectors may comprise means for determining at least one of a content, a magnitude, and a direction characteristic of each motion vector in the plurality of motion vectors, and means for assigning a label to each motion vector based on one or more of the determined characteristics. The means for determining at least one of the content, the magnitude, the direction and the reference frame index characteristic of each motion vector in the plurality of motion vectors may comprise means for determining, for each motion vector, a starting content type for a starting point of the motion vector and an ending content type for an ending point of the motion vector. The means for assigning the label to each motion vector based on one or more of the determined characteristics may comprise means for labeling the motion vector as a suspicious motion vector if the starting content type of the motion vector is not the same as the ending content type of the motion vector. Each motion vector may be associated with a group of neighboring motion vectors, and the means for determining a classification of each motion vector may comprise means for examining at least one characteristic of each motion vector, means for comparing the at least one characteristic with an aggregate characteristic of the group of neighboring motion vectors, and means for classifying each motion vector as an outlier motion vector if the difference between the at least one characteristic and the aggregate characteristic of the group of neighboring motion vectors is above a predetermined threshold. The means for filtering the plurality of motion vectors based on the classification of each motion vector may comprise means for selecting an operation window, the operation window having a size based on a selected one of the content and block size, means for replacing each motion vector classified as an outlier motion vector in the operation window, and means for performing a smoothing operation within the operation window. The means for replacing each motion vector classified as an outlier motion vector in the operation window may comprise means for performing one of a median operation, a mean operation, and a Gaussian-type filter operation in the operation window. The means for performing the smoothing operation within the operation window may comprise means for performing a low pass filter operation in the operation window.

The embodiments described above are exemplary embodiments. Those skilled in the art may now make numerous uses of, and departures from, the above-described embodiments without departing from the inventive concepts disclosed herein. Various modifications to these embodiments may be readily apparent to those skilled in the art, and the generic principles defined herein may be applied to other embodiments, e.g., in an instant messaging service or any general wireless data communication applications, without departing from the spirit or scope of the novel aspects described herein. Thus, the scope of the invention is not intended to be limited to the embodiments shown herein but is to be accorded the widest scope consistent with the principles and novel features disclosed herein. The word "exemplary" is used exclusively herein to mean "serving as an example, instance, or illustration." Any embodiment described herein as "exemplary" is not necessarily to be construed as preferred or advantageous over other embodiments. Accordingly, the novel aspects of the embodiments disclosed herein is to be defined solely by the scope of the following claims.

What is claimed is:

1. A non-transitory computer readable medium having instructions stored thereon for causing a computer to execute a method for processing a plurality of motion vectors for a video frame, the method comprising:
   determining a number of different block sizes in the video frame; and
   performing a variable block size motion vector process if the number of different block sizes in the video frame is greater than one, the variable block size motion vector process comprising constructing a pyramid of motion vectors from the plurality of motion vectors, constructing the pyramid comprising oversampling the plurality of motion vectors to create a first layer of motion vectors at a first predetermined block size granularity, the pyramid having at least the first layer and a second layer of motion vectors, each of the first and second layers having a set of motion vectors based on a particular block size.

2. The computer readable medium of claim 1, wherein the method for processing the plurality of motion vectors further comprising:
   performing a fixed block size motion vector process if the number of different block sizes in the video frame is less than two, the fixed block size motion vector process comprising:
     scaling the plurality of motion vectors;
     attaching a label to each motion vector of the plurality of motion vectors;
     determining a classification of each motion vector; and
     filtering the plurality of motion vectors based on the classification of each motion vector.

3. The computer readable medium of claim 1, wherein constructing the pyramid of motion vectors from the plurality of motion vectors comprises:
   merging at least two of the motion vectors from the set of motion vectors in the first layer of motion vectors to create the second layer of motion vectors at a second predetermined block size granularity, the second predetermined block size granularity being greater than the first predetermined block size granularity.

4. The computer readable medium of claim 3, wherein merging at least two of the motion vectors from the set of motion vectors in the first layer of motion vectors comprises:
   performing an averaging operation on at least two of the motion vectors from the set of motion vectors in the first layer of motion vectors.

5. A method for processing a plurality of motion vectors for a video frame, the method comprising:
   determining a number of different block sizes in the video frame; and, performing a variable block size motion vector process if the number of different block sizes in the video frame is greater than one, the variable block size motion vector process comprising constructing a pyramid of motion vectors from the plurality of motion vectors, constructing the pyramid comprising oversampling the plurality of motion vectors to create a first layer of motion vectors at a first predetermined block size granularity, the pyramid having at least the first layer and a second layer of motion vectors, each of the first and second layers having a set of motion vectors based on a particular block size.

6. The method of claim 5, further comprising:
   performing a fixed block size motion vector process if the number of different block sizes in the video frame is less than two, the fixed block size motion vector process comprising:
     scaling the plurality of motion vectors;
     attaching a label to each motion vector of the plurality of motion vectors;
     determining a classification of each motion vector; and
     filtering the plurality of motion vectors based on the classification of each motion vector.

7. The method of claim 6, wherein each motion vector of the plurality of motion vectors has a magnitude and scaling the plurality of motion vectors comprises:
   calculating a ratio of: (i) a first distance between the video frame to a first reference frame; and (ii) a second distance between the first reference frame to a second reference frame; and
   scaling each motion vector by adjusting the magnitude of the motion vector based on the ratio of the first distance and the second distance.

8. The method of claim 7, wherein the video frame is a frame to be interpolated, the first reference frame is a current frame and the second reference frame is a reference frame to which the motion vector points.

9. An apparatus for processing a plurality of motion vectors for a video frame, the apparatus comprising:
   a programmable circuit configured to determine a number of different block sizes in the video frame; and
   a programmable circuit configured to perform a variable block size motion vector process if the number of different block sizes in the video frame is greater than one, the programmable circuit configured to perform the variable block size motion vector process comprising a programmable circuit configured to construct a pyramid of motion vectors from the plurality of motion vectors, the programmable circuit configured to construct a pyramid comprising a programmable circuit configured to oversample the plurality of motion vectors to create a first layer of motion vectors at a first predetermined block size granularity, the pyramid having at least the first layer and a second layer of motion vectors, each of the first and second layers having a set of motion vectors based on a particular block size.

10. The apparatus of claim 9, further comprising:
    a programmable circuit configured to perform a fixed block size motion vector process if the number of different block sizes in the video frame is less than two, the programmable circuit configured to perform the fixed block size motion vector process comprising:
      a programmable circuit configured to scale the plurality of motion vectors;
      a programmable circuit configured to attach a label to each motion vector of the plurality of motion vectors;
      a programmable circuit configured to determine a classification of each motion vector; and
      a programmable circuit configured to filter the plurality of motion vectors based on the classification of each motion vector.

11. The apparatus of claim 10, wherein the programmable circuit configured to attach the label to each motion vector of the plurality of motion vectors comprises:
    a programmable circuit configured to determine at least one of a content, a magnitude, a direction, and a reference frame index characteristic of each motion vector of the plurality of motion vectors; and
    a programmable circuit configured to assign a label to each motion vector based on one or more of the determined characteristics.

12. The apparatus of claim 11, wherein the programmable circuit configured to determine at least one of the content, the magnitude, the direction and the reference frame index characteristic of each motion vector of the plurality of motion vectors comprises:

a programmable circuit configured to determine, for each motion vector, a starting content type for a starting point of the motion vector and an ending content type for an ending point of the motion vector.

13. A motion vector processor for processing a plurality of motion vectors for a video frame, the motion vector processor comprising:

means for determining a number of different block sizes in the video frame; and means for performing a variable block size motion vector process if the number of different block sizes in the video frame is greater than one, the means for performing the variable block size motion vector process comprising means for constructing a pyramid of motion vectors from the plurality of motion vectors, the means for constructing the pyramid comprising means for oversampling the plurality of motion vectors to create a first layer of motion vectors at a first predetermined block size granularity, the pyramid having at least the first layer and a second layer of motion vectors, each of the first and second layers having a set of motion vectors based on a particular block size.

14. The motion vector processor of claim 13, further comprising:

means for performing a fixed block size motion vector process if the number of different block sizes in the video frame is less than two, the means for performing the fixed block size motion vector process comprising:

means for scaling the plurality of motion vectors;

means for attaching a label to each motion vector of the plurality of motion vectors;

means for determining a classification of each motion vector; and means for filtering the plurality of motion vectors based on the classification of each motion vector.

15. The motion vector processor of claim 14, wherein each motion vector is associated with a group of neighboring motion vectors, and the means for determining a classification of each motion vector comprises:

means for examining at least one characteristic of each motion vector;

means for comparing the at least one characteristic with an aggregate characteristic of the group of neighboring motion vectors; and means for classifying each motion vector as an outlier motion vector if the difference between the at least one characteristic and the aggregate characteristic of the group of neighboring motion vectors is above a predetermined threshold.

16. The motion vector processor of claim 14, wherein the means for filtering the plurality of motion vectors based on the classification of each motion vector comprises:

means for selecting an operation window, the operation window having a size based on a selected one of the content and block size;

means for replacing each motion vector classified as an outlier motion vector in the operation window; and means for performing a smoothing operation within the operation window.

* * * * *